(12) United States Patent
Buentello et al.

(10) Patent No.: US 10,296,909 B1
(45) Date of Patent: *May 21, 2019

(54) METHOD FOR PREVENTING CHECK FRAUD

(71) Applicant: United Services Automobile Association (USAA), San Antonio, TX (US)

(72) Inventors: Andre Rene Buentello, San Antonio, TX (US); Sharon Kay Haverlah, Bulverde, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 317 days.

This patent is subject to a terminal disclaimer.

(21) Appl. No.: 14/088,726

(22) Filed: Nov. 25, 2013

Related U.S. Application Data

(63) Continuation of application No. 13/562,130, filed on Jul. 30, 2012, now Pat. No. 8,590,781, which is a
(Continued)

(51) Int. Cl.
*G06Q 40/00* (2012.01)
*G07D 7/0043* (2016.01)
(Continued)

(52) U.S. Cl.
CPC ....... *G06Q 20/4014* (2013.01); *G06Q 20/042* (2013.01); *G06Q 20/382* (2013.01); *G07D 7/0043* (2017.05); *G06K 2017/0038* (2013.01)

(58) Field of Classification Search
CPC .. G06Q 20/042; G06Q 20/4037; G06Q 40/02; G06Q 20/10; G06Q 20/108;
(Continued)

(56) References Cited

U.S. PATENT DOCUMENTS 4,728,784 A * 3/1988 Stewart ............... G06K 1/12
235/436
5,509,692 A 4/1996 Oz
(Continued)

OTHER PUBLICATIONS

"Decoding small QR codes by hand". Sep. 17, 2014. Web. Mar. 2, 2017. <http://blog.qartis.com/decoding-small-qr-codes-by-hand>. Internet Archive. <http://web.archive.org/web/20140917234128/http://blog.gartis.com/decoding-small-qr-codes-by-hand>.*
(Continued)

*Primary Examiner* — Suezu Ellis
(74) *Attorney, Agent, or Firm* — Perkins Coie LLP (57) ABSTRACT

Systems and methods for processing checks using 2D barcodes are provided. A user submits a digital image of a check that includes a 2D barcode. The 2D barcode has embedded positional information of one or more check features which can be decoded and compared to the check features optically identified on the digital image of the check. From this, a set of rotational and scaling adjustments can be computed by comparing estimated positional information with the positional information of the one or more check features retrieved from the barcode. A more accurate representation of the check is then produced by applying the set of rotational and scaling adjustments to the digital image of the check. Once a more accurate representation of the check has been produced, the check can be electronically processed using a routing transit number found on the check.

17 Claims, 10 Drawing Sheets

Related U.S. Application Data continuation of application No. 12/967,735, filed on Dec. 14, 2010, now Pat. No. 8,231,057.

(51) Int. Cl.
| | | |
|---|---|---|
| *G06K 9/00* | (2006.01) | |
| *G06K 7/10* | (2006.01) | |
| *G06Q 20/40* | (2012.01) | |
| *G06Q 20/04* | (2012.01) | |
| *G06Q 20/38* | (2012.01) | |
| *G06K 17/00* | (2006.01) | |

(58) Field of Classification Search
CPC ............ G06Q 20/0425; G06Q 20/403; G06Q 20/4033; G06K 2017/0038
USPC .............................. 235/379; 705/45; 194/210
See application file for complete search history.

(56) References Cited

U.S. PATENT DOCUMENTS

| | | |
|---|---|---|
| 5,594,226 A | 1/1997 | Steger |
| 5,631,984 A | 5/1997 | Graf et al. |
| 5,940,595 A * | 8/1999 | Reber ............... G06F 17/30879 707/E17.113 |
| 6,073,121 A | 6/2000 | Ramzy |
| 6,126,203 A | 10/2000 | Dwork et al. |
| 6,212,504 B1 * | 4/2001 | Hayosh ............... G06Q 20/042 235/375 |
| 7,040,539 B1 | 5/2006 | Stover |
| 7,168,614 B2 | 1/2007 | Kotovich et al. |
| 7,266,527 B1 | 9/2007 | Martin |
| 7,377,425 B1 | 5/2008 | Ma et al. |
| 7,471,818 B1 | 12/2008 | Price et al. |
| 7,548,641 B2 | 6/2009 | Gilson et al. |
| 7,649,658 B2 | 1/2010 | Cordery et al. |
| 7,742,080 B2 | 6/2010 | Nakajima |
| 8,079,524 B2 | 12/2011 | He et al. |
| 8,231,057 B1 | 7/2012 | Buentello et al. |
| 8,290,237 B1 | 10/2012 | Burks et al. |
| 8,590,781 B1 * | 11/2013 | Buentello et al. ....... 235/462.11 |
| 2003/0218061 A1 * | 11/2003 | Filatov .......................... 235/379 |
| 2005/0021474 A1 * | 1/2005 | Geist .................... G06Q 20/341 705/63 |
| 2005/0049969 A1 | 3/2005 | Kane |
| 2005/0089209 A1 | 4/2005 | Stefanuk |
| 2005/0097019 A1 | 5/2005 | Jacobs |
| 2005/0131820 A1 | 6/2005 | Rodriguez et al. |
| 2007/0127805 A1 | 6/2007 | Foth et al. |
| 2007/0194103 A1 | 8/2007 | Manheim |
| 2009/0252437 A1 | 10/2009 | Li et al. |
| 2011/0240742 A1 | 10/2011 | Li et al. |

OTHER PUBLICATIONS

Marlin, Steven "Banks Prepare for Image Capture," InformationWeek, 5 pages, May 3, 2004.

* cited by examiner

METHOD FOR PREVENTING CHECK FRAUD

CROSS REFERENCE TO RELATED APPLICATIONS

This application is a continuation of U.S. patent application Ser. No. 13/562,130, filed on Jul. 30, 2012, now allowed, which is a continuation of U.S. patent application Ser. No. 12/967,735, filed on Dec. 14, 2010, now U.S. Pat. No. 8,231,057, the entire contents of which are hereby incorporated by reference for all purposes.

TECHNICAL FIELD

Various embodiments of the present invention generally relate to electronic image presentations. More specifically, various embodiments of the present invention relate to using 2D barcodes on checks to decrease non-conforming image percentages.

BACKGROUND

Checks provide a safe and convenient method to transfer money between individuals and companies. Typically, a checking account, or other similar account, must be opened at a financial institution and funds deposited. These funds are then available for withdrawal. The payor (e.g., the account owner) usually designates a payee (e.g., a merchant or seller), an amount payable on the check, and signs the check. As a result, the check becomes negotiable and authorizes funds to be withdrawn from the payor's account and transferred to the payee.

SUMMARY

Systems and methods are described for using 2D barcodes on checks to decrease non-conforming image percentages. In some embodiments, a digital image of a check that has been remotely captured by a user can be received. The digital image of the check can include a 2D barcode with embedded positional information of one or more check features (e.g., signature line, a date line, a memo line, a check number, a magnetic ink character recognition code, an amount line, and/or an amount block). The positional information embedded within the 2D barcode of the one or more check features can be decoded. In addition, one or more check features on the digital image of the check can be optically identified. Examples of positional information within the 2D barcode include, but are not limited to, a size of the check, a distance to a signature line on the check, a distance to one or more edges of the check, a distance from an edge of the check to the top, bottom, start, or end of a magnetic ink character recognition (MICR) code, and a distance to amount block on the check.

Based on the one or more check features that were optically identified, estimated positional information for the one or more check features can be generated. A set of rotational and scaling adjustments can be computed by comparing the estimated positional information with the positional information of the one or more check features. A more accurate representation of the check can be produced by applying the set of rotational and scaling adjustments to the digital image of the check. Once a more accurate representation of the check has been produced, the check can be electronically processed using a routing transit number found on the check.

In some embodiments, the 2D barcode can also include one or more check parameters. These check parameters can be decoded and used for processing, verification, and/or fraud prevention. Examples of check parameters include, but are not limited to, an account indicator if the check is drawn from a business account or a personal account, a maximum amount allowed on the check, account information, a government identifier, or an electronic watermark.

Account holder information can also be embedded in the 2D barcode. Examples of account holder information that can be embedded within the 2D barcode include, but are not limited to, a driver's license number of an account holder of the check, a representation of the signature, and/or a photo of the account holder. The account holder information embedded within the 2D barcode can be decoded and presented to a recipient of the check (e.g., via a point of sale device).

Embodiments of the present invention also include computer-readable storage media containing sets of instructions to cause one or more processors to perform the methods, variations of the methods, and other operations described herein.

Various embodiments provide for a system comprising an image receiving module, a processing module, an estimation module, and an adjustment module. The image receiving module can receive a digital image of a check that has been remotely captured by a user (e.g., using a camera on a mobile phone). The digital image of the captured check includes a 2D barcode with embedded positional information of one or more check features (e.g., a signature line, a date line, a memo line, a check number, a magnetic ink character recognition code, an amount line, and/or an amount block).

The processing module decodes the positional information embedded within the 2D barcode and optically identifies the one or more check features on the digital image of the check. The positional information can include the location, size of, and/or distance between any two elements of a check. Examples of positional information include, but are not limited to, a size of the check, a distance to a signature line on the check, a distance to one or more edges of the check, a distance from an edge of the check to the top, bottom, start, or end of a magnetic ink character recognition (MICR) code, and a distance to amount block on the check.

The estimation module generates estimated positional information of the one or more check features that were optically identified and determines a set of rotational and scaling adjustments. In accordance with various embodiments, the set of rotational and scaling adjustments can be determined by comparing the estimated positional information with the positional information of the one or more check features. The adjustment module applies the set of rotational and scaling adjustments to the digital image of the check to produce a more accurate representation of the check.

In one or more embodiments, the system can also include an account database and an accounting module. The account database can be used to store a plurality of financial accounts of members of a membership organization. The user of the check processing system can be a member of the membership organization and can make deposits into a user account that is one of the plurality of financial accounts associated with the user. The accounting module electronically processes the more accurate representation of the check and deposits funds from the check into the user account.

The system can include other modules and components such as an information module, a decoding module, a verification module, and/or a point of sale device. The information module can be used to gather information about the user and a user account where funds from the check will be deposited. The decoding module can decode the one or more check parameters and account holder information embedded within the 2D barcode. The verification module can verify, during the processing of the check, the one or more check parameters that were decoded. The point of sale device can present the account holder information to a recipient of the check.

Examples of check parameters include, but are not limited to, an account indicator identifying if the check is drawn from a business account or a personal account, a maximum amount allowed on the check, account information, a government identifier, and/or an electronic watermark. Examples of account holder information include, but are not limited to, a driver's license number of an account holder of the check, a representation of the signature, and/or a photo of the account holder.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to systems and methods for electronic image presentation. More specifically, some embodiments of the present invention use a 2D barcode to code check information for electronic image presentation to decrease non-conforming image rates. Remotely captured electronic images of checks can be taken at different locations (e.g., on a table, on a bed, etc) and under different lighting conditions. Moreover, checks come in different sizes (e.g., corporate issue refund checks, standard personal checks, etc). As a result, the check images that are submitted for processing can be distorted (e.g., geometry transformations such as enlargement, reduction, and rotation; color distortions; etc) making electronic image processing difficult, if not impossible.

Various embodiments of the present invention use 2D barcodes to provide necessary information about the account holder represented on the check and the check parameters or features. This information can be used to transform the remote capture electronic image(s) into a more accurate representation of the actual check. For example, suppose that image A is an electronic image of a check received from user of the system. Image A can have geometric distortions, enlarged portions, reduced portions, rotational offsets, color distortions, and others when compared to the original check that the user captured. Using a 2D barcode on the check, a more accurate image B can be produced. The more accurate image B, will reduce or eliminate the distortions found within image A and more accurately represent the original check and/or make electronic processing of the check more likely to be successful. As such, image B is a more accurate image of the original check when one or more of the distortions (i.e., the geometric distortions, enlarged portions, reduced portions, rotational offsets, color distortions, etc.) have been reduced or eliminated.

Examples of check parameters can include, but are not limited to, the size of check, placement of key identifiers on check (signature line, MICR code, etc), business or personal account, largest amount allowed on check, account information, government identifiers such as electronic watermarks for checks issues via IRS or other government agencies, and others. Examples of account holder information can include personal information such as, but not limited to, driver's license number, signature, photo of the account holder, and others. This account holder information and/or the check parameters can be used in processing the check and in fraud prevention by transferring the information to a point of sale device. For example, if a driver's license and picture is retrieved from the 2D barcode and displayed on a point of sale device, the operator of the device can use the picture and driver's license number to determine if a transaction should be made.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Figure 1:
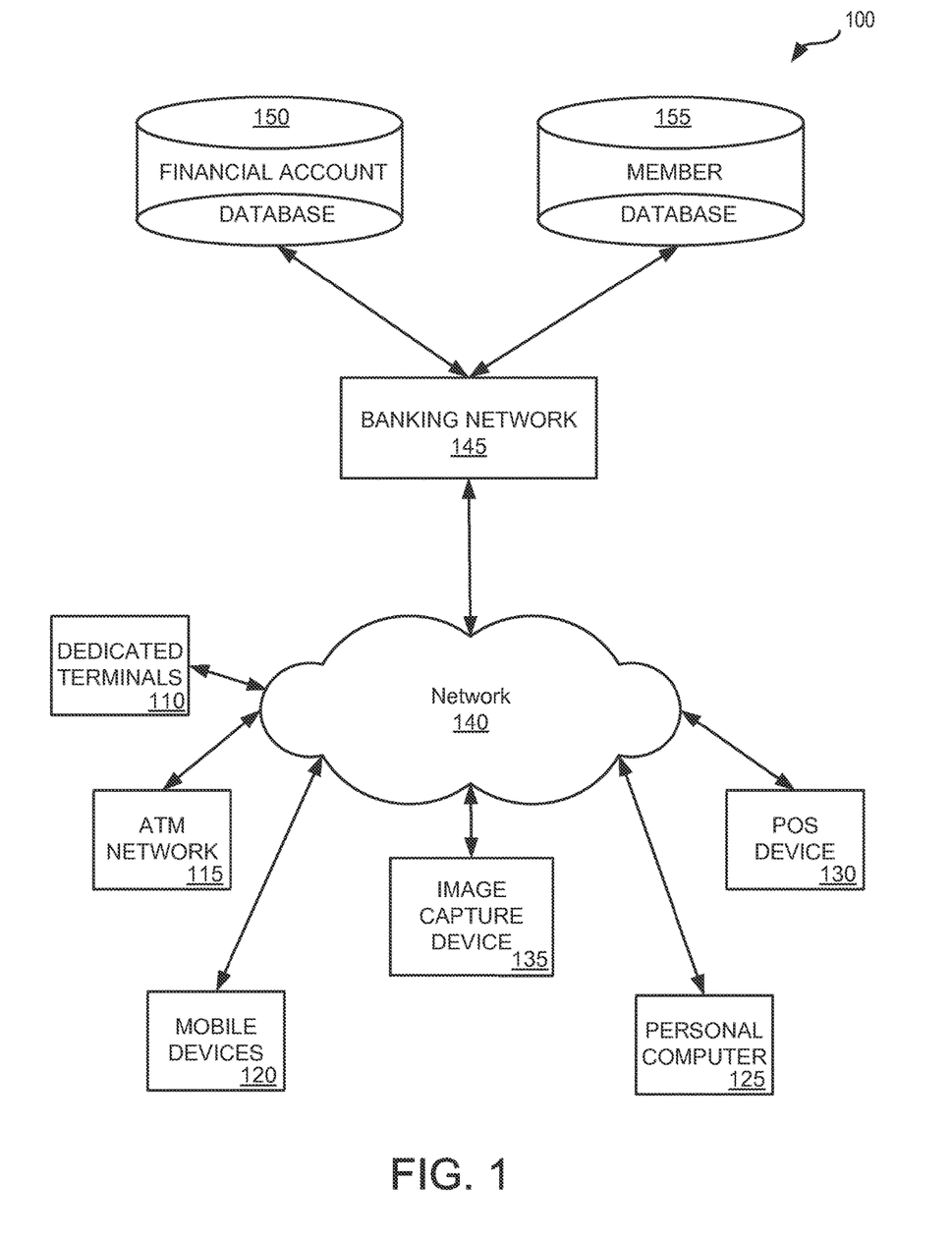
FIG. 1 illustrates an example of an operating environment in which some embodiments of the present invention may be utilized.

FIG. 1 illustrates an example of an operating environment 100 in which some embodiments of the present invention may be utilized. The embodiments of the present invention illustrated in FIG. 1 allow user interactions through various points of interaction such as, but not limited to, dedicated terminals 110 (e.g., public terminal or kiosk), ATM networks 115 (e.g., interbank ATM network and intrabank ATM networks), mobile devices 120 (e.g., mobile phone), personal computers 125, point of sale (POS) devices 130, and image capture devices 135. These points of interaction can include mechanisms for capturing images (e.g., a camera) and connect through network 140 to banking network 145 and may run one or more applications or clients that allow a user to interact with the banking network (e.g., by submitting a digital image of a check for processing). Such applications may provide access to electronic image check processing systems and interfaces along with traditional banking functionality such as withdrawals, balance inquiries, deposits, transfers, etc.

Dedicated terminals 110 such as public terminals/kiosks may be computers available to the public and/or specially designed kiosks that interact with banking network 140. ATM networks 115 can be any set of ATMs in an interbank ATM network and/or intrabank ATM network. Mobile devices 120 may be cellular phones, smart phones (a smart phone being a cellular phone that has capabilities and features such as, but not limited to, internet access, a full keyboard, email access, Wi-Fi connection capabilities, BLUETOOTH connectivity, or any other functionality of a computer), tablet computers (a portable computer having a touch interface), netbooks, laptops possibly with a wireless connection (such as an 802.11a/b/g connection or mobile broadband connection, such as via a 3G or 4G wireless network). Personal computers 125 may be any computer (e.g., desktop computers, laptop computers, netbooks, tablet computers, Internet-enabled television devices, etc.) connected to network 140. POS devices 130 can be any device used as a checkout for a merchant. For example, POS device 130 can be a terminal located at the merchant, a computer-based interface such as a webpage or custom application, a telephone payment system, and others. Image capture device 135 can be any device (e.g, camera, scanner, etc.) capable of capturing an image and communicating with network 140.

Banking network 145 may include any number of membership organizations, banks, credit unions, or other financial institutions. In accordance with embodiments of the present invention, banking network 145 can use a variety of interaction methods, protocols, and systems. For example, banking network 145 can use any of the automated clearing house (ACH) networks. An ACH network may be operated by NACHA (previously referred to as the National Automated Clearing House Association). Another ACH network may be the Electronic Payments Network (EPN). These ACH networks may interact to settle ACH transactions involving a party that has a relationship with only NACHA's ACH network or only the EPN. Other banking networks, such as CIRRUS, NYCE, and PULSE may also be used.

As illustrated in FIG. 1, banking network 145 can be communicably coupled to one or more databases such as financial account database 150 and member database 155. These databases can have a variety of information that can be utilized by the check processing systems. For example, financial account database 155 includes account information for members of a financial institution. Member database 155 stores information about members (or customers) of a membership organization (or financial institution). For example, membership database 155 can include information such as employer, total balance of all accounts held at the membership organization, credit ratings, home ownership information, annual salary, length of membership, and/or other information. In some embodiments, these two databases can be integrated into one database. A computer system associated with a membership organization, a bank, a credit union, or other financial institution within banking network 145 may be able to access these (and other) databases for account information, customer information, and other stored information.

Figure 2:
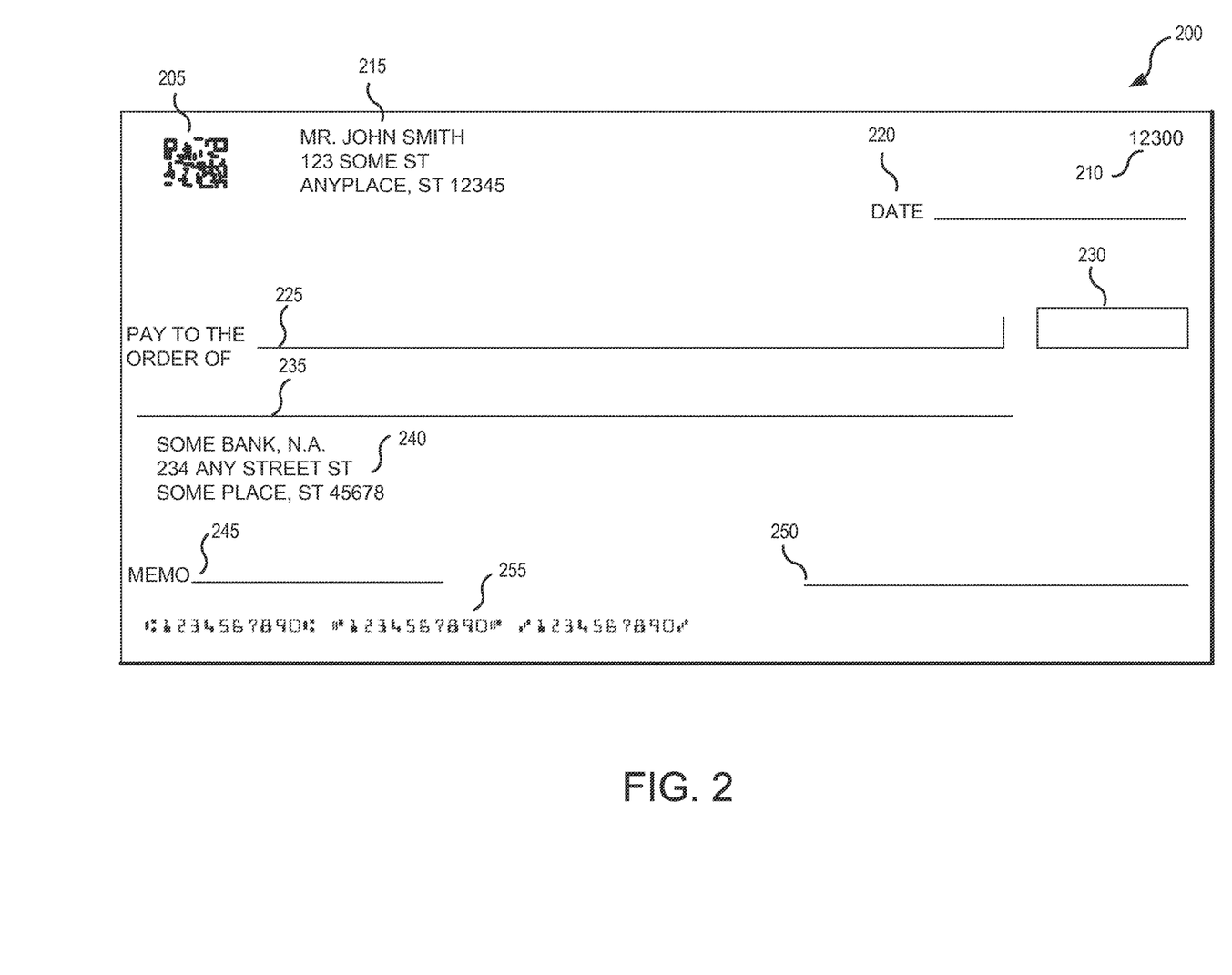
FIG. 2 illustrates an example of a check with a 2D barcode that can be used in accordance with one or more embodiments of the present invention.

FIG. 2 illustrates an example of check 200 with a 2D barcode 205 that can be used in accordance with one or more embodiments of the present invention. Check 200 illustrated in FIG. 2 includes check number 210, owner identifying section 215 which has information such as a name, address, and phone number of the account owner. Check 200 also includes date line 220, payee field 225, amount block 230, amount line 235, bank identification section 240, memo line 245, signature line 250, and MICR code 255.

Figure 3:
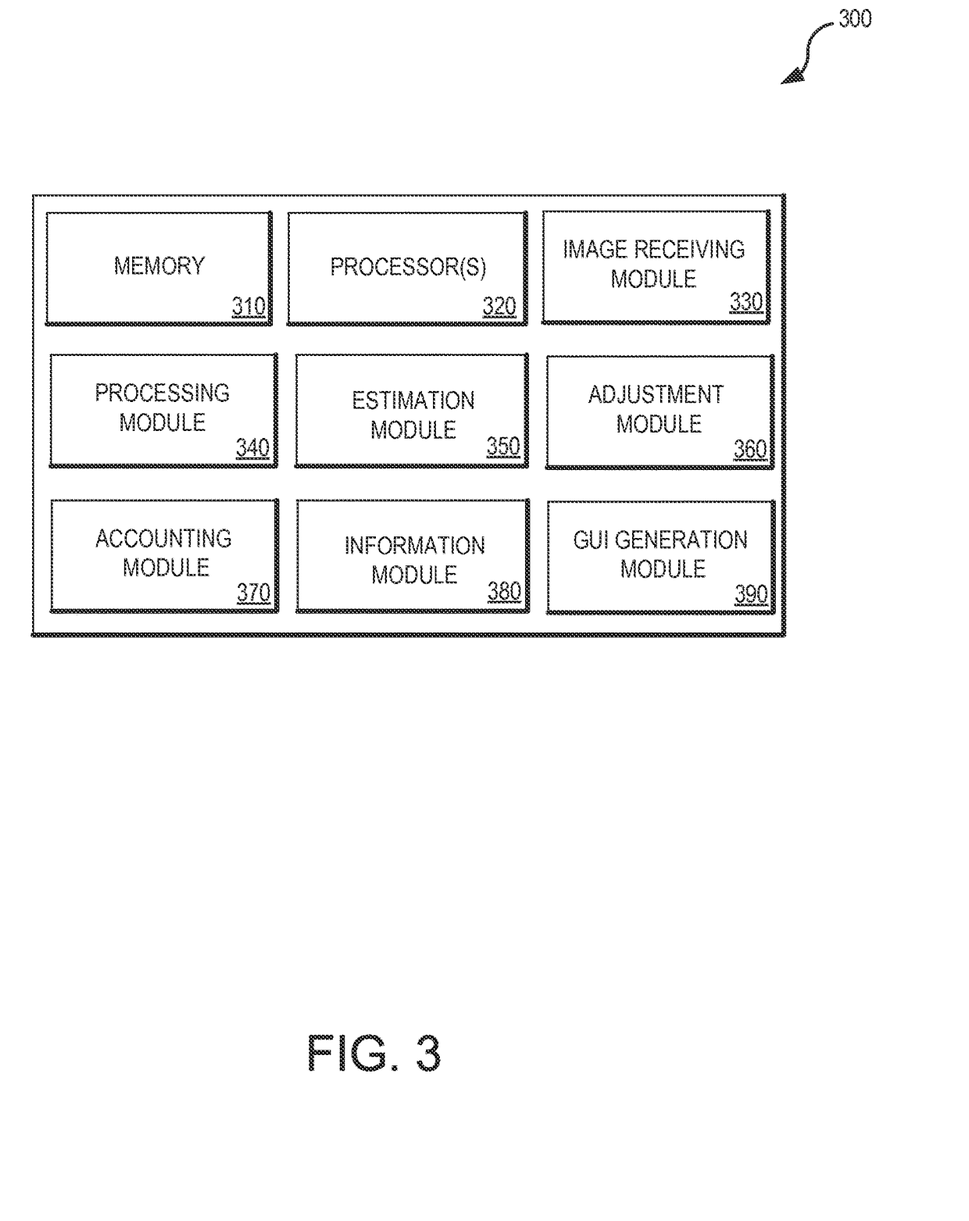
FIG. 3 is a block diagram illustrating exemplary components that can be included in a check processing system in accordance with various embodiments of the present invention.

FIG. 3 is a block diagram illustrating exemplary components that can be included in a check processing system 300 in accordance with various embodiments of the present invention. According to the embodiments shown in FIG. 3, the check processing system 300 can include memory 310, one or more processors 320, image receiving module 330, processing module 340, estimation module 350, adjustment module 360, accounting module 370, information module 380, and GUI generation module 390. Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module.

For example, in one embodiment, the functionality associated with estimation module 350 and adjustment module 360 can be incorporated into a single image improvement module. As another example, in one embodiment, the estimation module 350 can be separated into a rotational estimation module to estimate rotational distortions, a scaling estimation module to estimate scaling distortions, a color estimation module to estimate color distortions such as brightness and contrast, and a quantization estimation module to estimate quantization distortions. Moreover, the output of these modules can be a more accurate electronic image of the check or a set of characteristics or parameters providing information to correct the image submitted by the user.

Memory 310 can be any device, mechanism, or populated data structure used for storing information. In accordance with some embodiments of the present invention, memory 310 can encompass any type of, but is not limited to, volatile memory, nonvolatile memory and dynamic memory. For example, memory 310 can be random access memory, memory storage devices, optical memory devices, media magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 310 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 310.

Memory 310 may be used to store instructions for running one or more applications or modules on processor(s) 320. For example, memory 310 could be used in one or more embodiments to house all or some of the instructions needed to execute the functionality of image receiving module 330, processing module 340, estimation module 350, adjustment module 360, accounting module 370, information module 380, and GUI generation module 390.

Image receiving module 330 is configured to receive a digital image of a check that has been remotely captured by a user (e.g., using a camera on a mobile phone). The digital image can be captured at dedicated terminals 110, an ATM in ATM networks 115, mobile devices 120, personal computers 125, point of sale (POS) devices 130, and/or other image capture devices 135. The digital image of the captured check includes a 2D barcode with embedded positional information of one or more check features (e.g., date line 220, payee field 225, amount block 230, amount line 235, bank identification section 240, memo line 245, signature line 250, and MICR code 255). In some embodiments, image receiving module 330 can request additional images of the check from the user (e.g., if the check image cannot be successfully processed).

Processing module 340 decodes the positional information embedded within the 2D barcode and optically identifies the one or more check features on the digital image of the check. The positional information can include the location, size of, and/or distance between any two elements of a check. Examples of positional information include, but are not limited to, a size of the check, a distance to a signature line on the check, a distance to one or more edges of the check, a distance from an edge of the check to the top, bottom, start, or end of a magnetic ink character recognition (MICR) code, and a distance to amount block on the check. In some embodiments, the processing module 340 retrieves a set of positional information from a database containing information about the check features and/or size of the check.

Estimation module 350 generates estimated positional information of the one or more check features that were optically identified and determines a set of rotational and scaling adjustments. In one or more embodiments, estimation module 350 determines the edges of the digital image and identifies one or more check features. From this a distance estimation algorithm can be used to estimate the location and/or position information based on the digital image. In accordance with various embodiments, the set of rotational and scaling adjustments can be determined by comparing the estimated positional information with the positional information of the one or more check features. Adjustment module 360 applies the set of rotational and scaling adjustments to the digital image of the check to produce a more accurate representation of the check. In other embodiments, additional adjustments can be made to produce a more accurate representation of the check. For example, the 2D barcode can contain color information which allows for color adjustments to reduce or eliminate some or all of the color distortion in the digital image.

The more accurate representation of the check can be electronically processed using accounting module 370. In some embodiments, accounting module 370 deposits funds from the account associated with the check into a desired user account (e.g., specified through a user interface screen). Information module 380 gathers information about the user and a user account where funds from the check will be deposited. In some cases, information module 380 can access account and member information from financial account database 150 and member database 155. GUI generation module 390 can generate one or more user interface screens designed to receive user inputs, digital images of a check, select accounts for deposit, and/or process other requests from the user.

Figure 4:
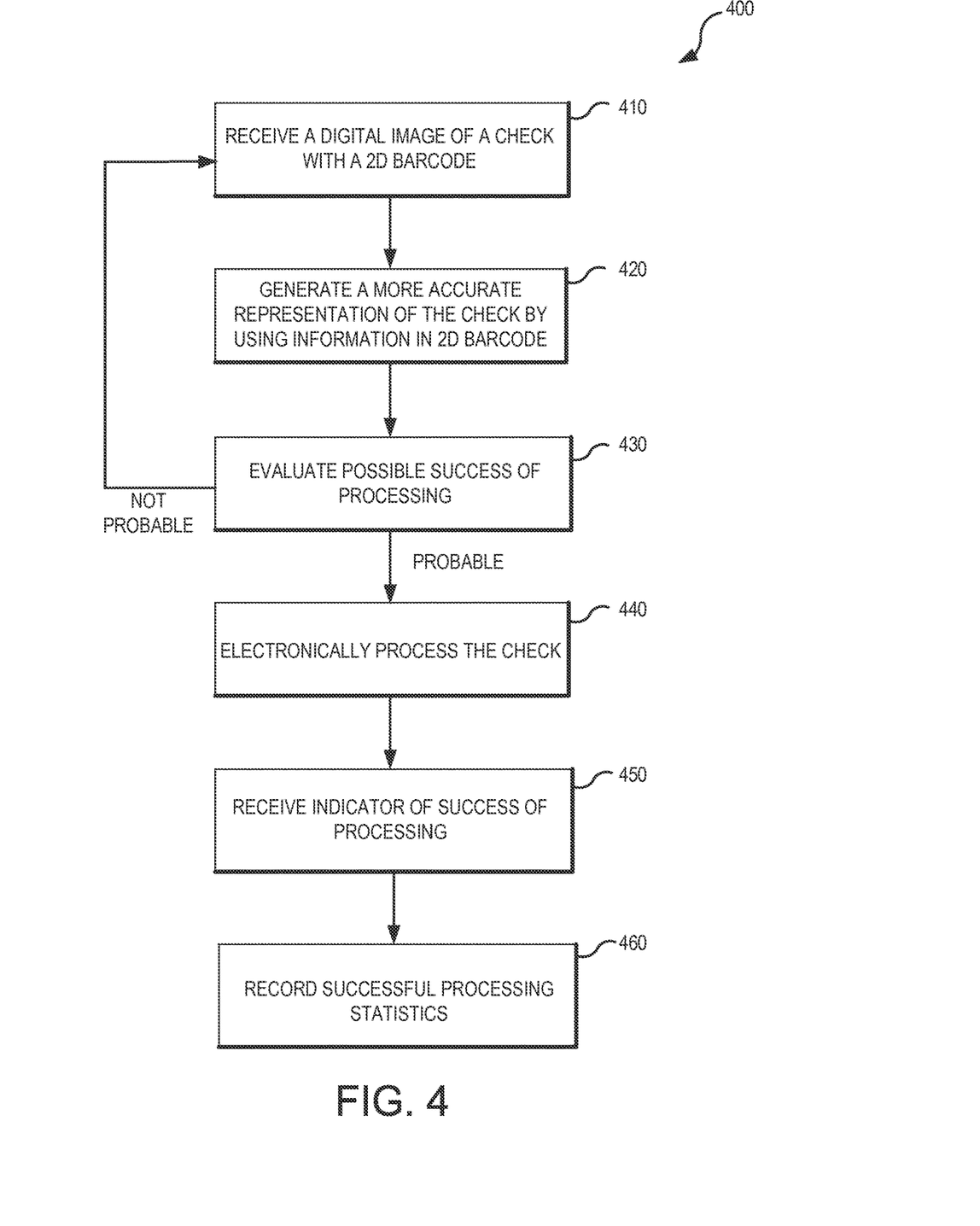
FIG. 4 is a flow chart illustrating a set of exemplary operations for electronically processing a digital image of a check in accordance with some embodiments of the present invention.

FIG. 4 is a flow chart illustrating a set of exemplary operations 400 for electronically processing a digital image of a check in accordance with some embodiments of the present invention. The electronic check processing system can receive a digital image of a check with a 2D barcode during image receiving operation 410. Image processing operation 420 generates a more accurate representation of the remotely captured digital image of a check submitted by a user that was received in receiving operation 410. As described in more detail in FIG. 5, the remotely captured digital image of a check can have a 2D barcode to provide necessary information about one or more check parameters or features. According to some embodiments, image processing operation 420 uses the 2D barcode to transform the remotely captured electronic image(s) into a more accurate representation of the actual check. For example, the more accurate image can have improvements in geometric distortions, enlarged portions, reduced portions, rotational offsets, color distortions, and others distortions found in the submitted image of the check.

Evaluation operation 430 evaluates the probability of successful processing of the more accurate image of the check generated by image processing operation 420. The probability of success can be based on any number of factors using an automated image evaluation system. For example, evaluation operation 430 can evaluate the probability of successful processing on one or more of the following features the image resolution, image type (e.g., color image, tonal image, or grayscale image), dynamic range, file size, compression scheme, document attributes and features (e.g., amount, MICR code, etc), and others. In some embodiments, the evaluation can be based on a set of criteria set forth in the 2D barcode. In some cases, the 2D barcode may indicate that the check is not eligible for image processing in which case this can be communicated to the user through graphical user interface screen.

If evaluation operation 430 determines that the probability of successful processing is not probable (e.g., below a preset threshold or score generated by the evaluation process), operation 430 branches to receiving operation 410 to receive one or more additional images of the check that have been remotely captured by the user. If evaluation operation 430 determines that the probability of successful processing is likely (e.g., above the preset threshold), evaluation operation 430 branches to electronic processing operation 440.

In accordance with one or more embodiments, electronic processing operation 440 processes the check using the banking network systems. In some cases, the electronic processing is done using a routing transit number found on the check. A confirmation can be received during indicator operation 450 indicating the success or failure of the electronic processing of the more accurate representation of the digital image. This information can be recorded along with a copy of the digital image and later used to during statistical analysis operation 460 for creating processing statistics and for the development and testing of other evaluation criteria, methods, and systems.

In some embodiments, these statistics can be used to identify faulty equipment (e.g., ATM or dedicated kiosk) when the success percentages are less than expected. In addition, some embodiments allow for statistical evaluation of users. This can be used, for example, to initially request multiple images from the user if a determination is made that multiple images will likely be needed, based on historical information, from the user. Still yet, various embodiments use the statistical information and captured images to provide a customized tutorial to the user to correct the problems commonly experienced by that specific user.

Figure 5:
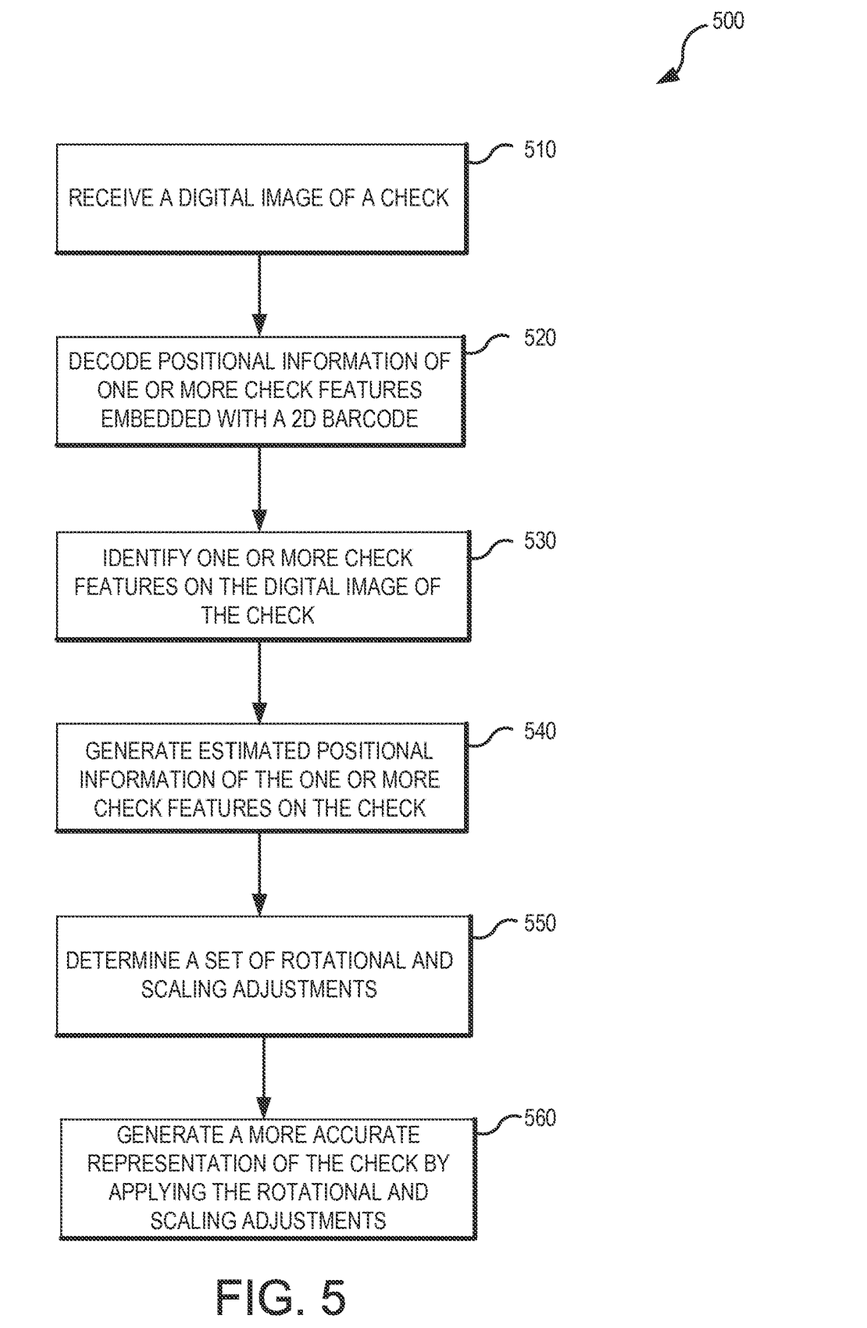
FIG. 5 is a flow chart illustrating a set of exemplary operations for generating a more accurate representation of a check in accordance with one or more embodiments of the present invention.

FIG. 5 is a flow chart illustrating a set of exemplary operations 500 for generating a more accurate representation of a check in accordance with one or more embodiments of the present invention. During receiving operation 510 a digital image of a check can be received. The digital image of the check can be remotely captured by the user using a camera in a mobile device, an ATM, a personal computer, a point of sale device, a dedicated terminal, or another image capture device. The digital image can then be transferred through a network to an electronic check processing system.

The remotely captured digital image of the check can have a 2D barcode that provides information about one or more check parameters or features. In some embodiments, the information is positional information of one or more check features such as, but not limited to, a signature line, a date line, a memo line, a check number, a MICR code, an amount line, and/or an amount block. The positional information can include an absolute position within the check in inches, centimeters, millimeters, or other measurement unit. In some cases, the positional information provides a distance between two check features, points on the check, and/or edges of the check. As other examples, the positional information can include a size of the check, a distance to a signature line on the check, a distance to one or more edges of the check, a distance from an edge of the check to the top, bottom, start, or end of a magnetic ink character recognition (MICR) code, and/or a distance to amount block on the check Decoding operation 520 reads the 2D barcode and decodes positional information of one or more check features embedded within the 2D barcode. In some embodiments, the barcode can also include additional information such as color information that can be used to improve/correct color distortions within the digital image. During identification operation 530, one or more check features on the digital image of the check submitted by the user can be identified (e.g., using optical character recognition technology). From the identified check features, a set of estimated positional information can be produced during estimation operation 540.

The estimated positional information can be compared with the positional information retrieved from the 2D barcode. From this a set of rotational and scaling adjustments can be determined during adjustment determination operation 550. These adjustments can be applied to the digital image of the check supplied by the user to generate a more accurate representation of the check during adjustment application operation 560.

Exemplary Computer System Overview

Figure 6:
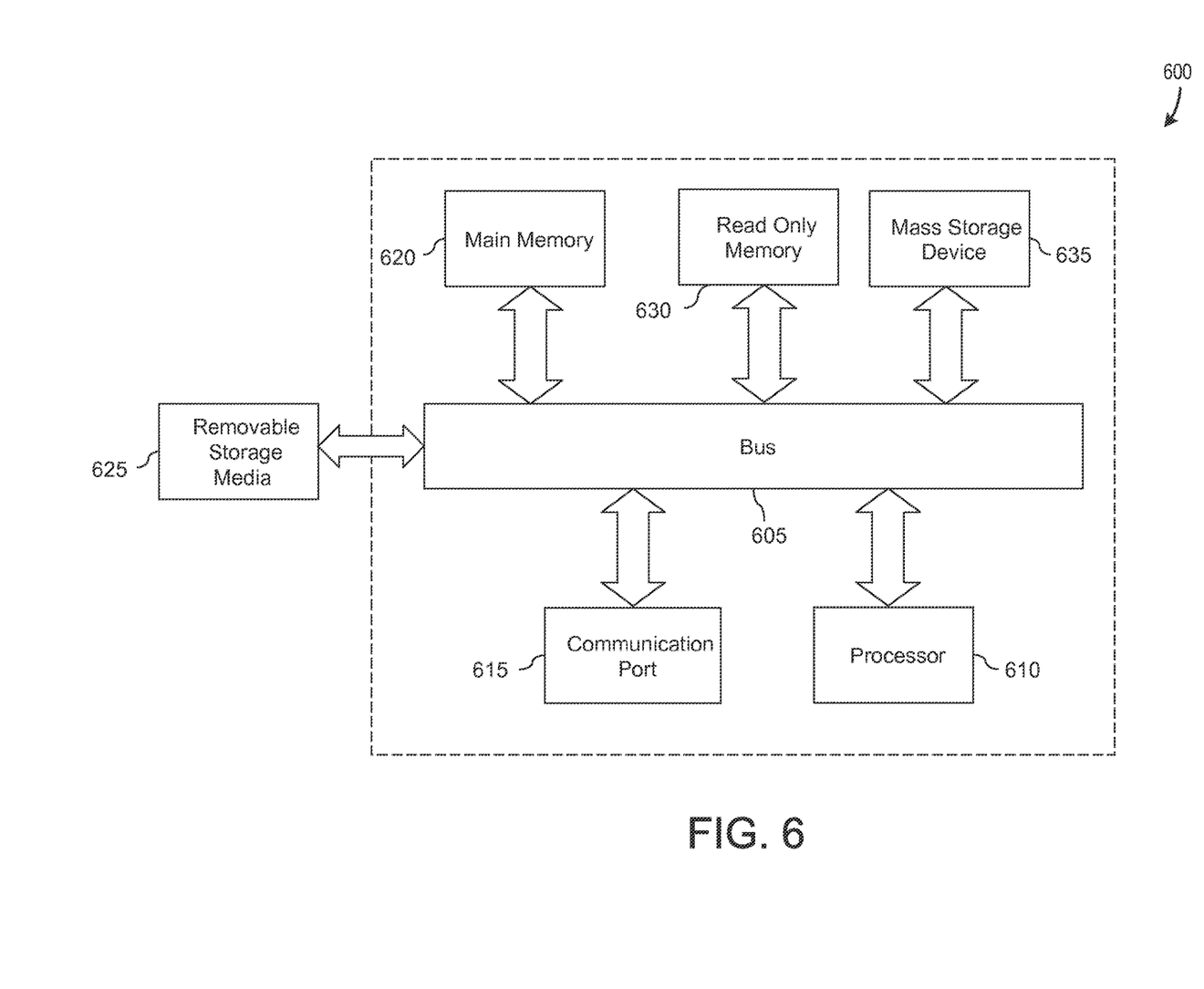
FIG. 6 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 6 is an example of a computer system 600 with which embodiments of the present invention may be utilized. According to the present example, the computer system includes a bus 605, at least one processor 610, at least one communication port 615, a main memory 620, a removable storage media 625, a read only memory 630, and a mass storage 635.

Processor(s) 610 can be any known processor, such as, but not limited to, an Intel® Itanium® or Itanium 2® processor(s), or AMD® Opteron® or Athlon MP® processor(s), or Motorola® lines of processors. Communication port(s) 615 can be any of an RS-232 port for use with a modem based dialup connection, a 10/100 Ethernet port, or a Gigabit port using copper or fiber. Communication port(s) 615 may be chosen depending on a network such a Local Area Network (LAN), Wide Area Network (WAN), or any network to which the computer system 600 connects.

Main memory 620 can be Random Access Memory (RAM), or any other dynamic storage device(s) commonly known in the art. Read only memory 630 can be any static storage device(s) such as Programmable Read Only Memory (PROM) chips for storing static information such as instructions for processor 610.

Mass storage 635 can be used to store information and instructions. For example, hard disks such as the Adaptec® family of SCSI drives, an optical disc, an array of disks such as RAID, such as the Adaptec family of RAID drives, or any other mass storage devices may be used.

Bus 605 communicatively couples processor(s) 610 with the other memory, storage and communication blocks. Bus 605 can be a PCI/PCI-X or SCSI based system bus depending on the storage devices used.

Removable storage media 625 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

The components described above are meant to exemplify some types of possibilities. In no way should the aforementioned examples limit the scope of the invention, as they are only exemplary embodiments.

Figure 7:
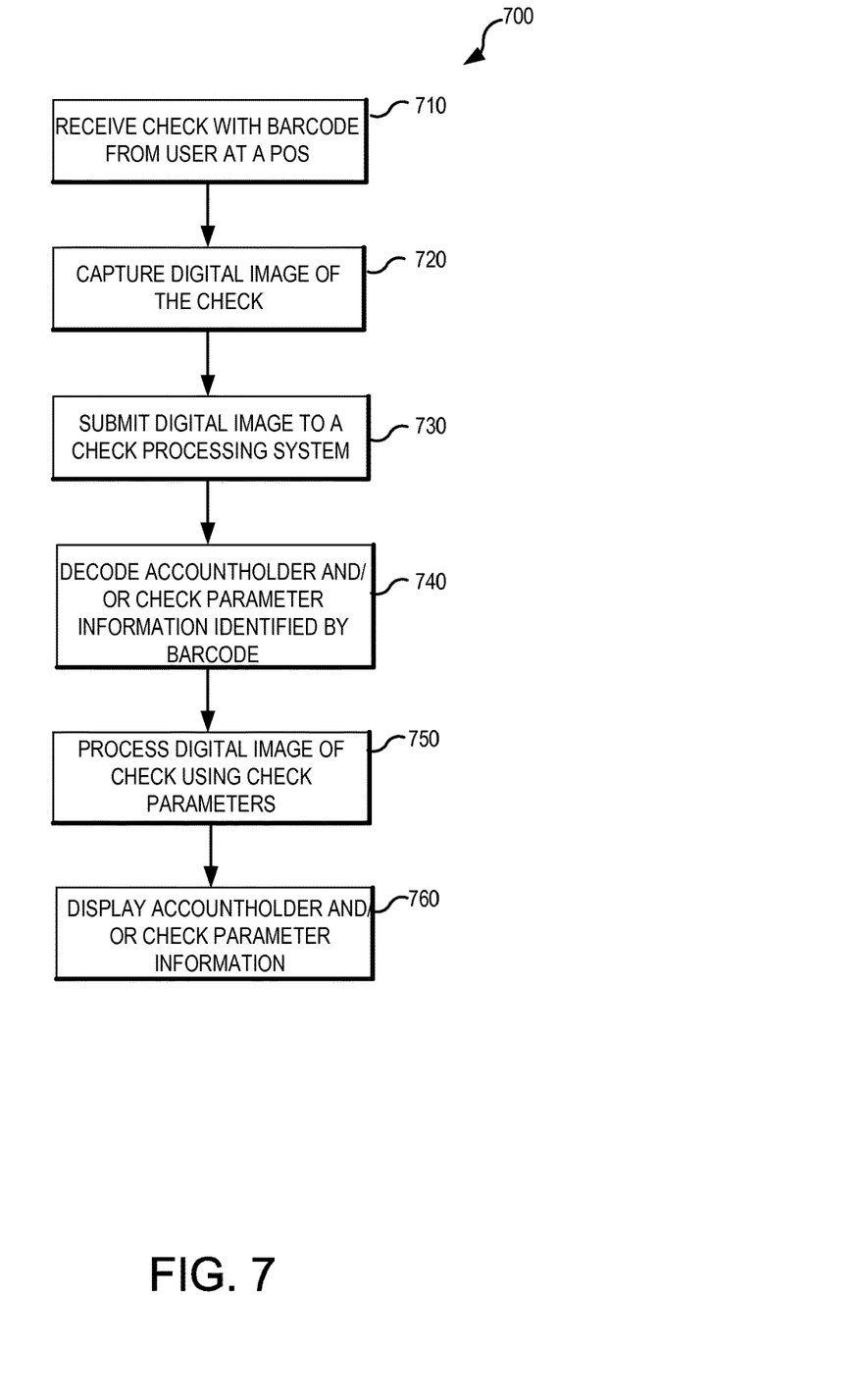
FIG. 7 is a flow chart illustrating a set of operations in accordance with one or more embodiments of the present disclosure.

FIG. 7 is a flow chart illustrating a set of operations 700. Receiving operation 710 receives a check with a barcode from a user at a point of sale. Capturing operation 720 captures a digital image of the check. Submitting operation 730 submits a digital image to a check processing system. Decoding operation 740 decodes accountholder and/or check parameter information identified by the barcode. Processing operation 750 processes the digital image of the check using check parameter. Displaying operation 760 displays accountholder and/or check parameter information.

Figure 8:
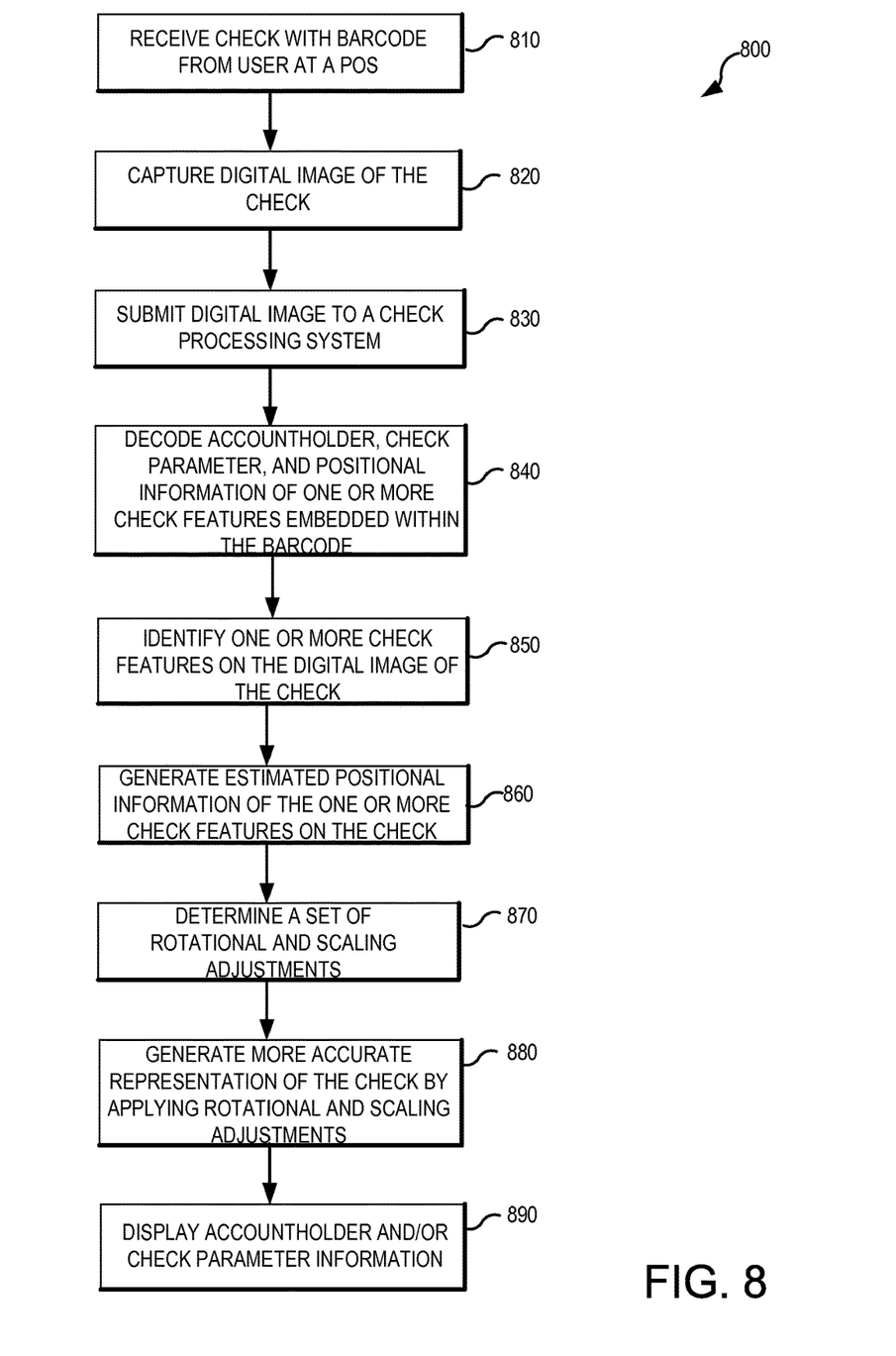
FIG. 8 is a flow chart illustrating a set of operations in accordance with one or more embodiments of the present disclosure.

FIG. 8 is a flow chart illustrating a set of operations 800. Receiving operation 810 receives a check with a barcode from a user at a point of sale. Capturing operation 820 captures a digital image of the check. Submitting operation 830 submits a digital image to a check processing system. Decoding operation 840 decodes accountholder, check parameter, and positional information of one or more of the check features embedded within the barcode. information identified by the barcode. Identifying operation 850 identifies one or more check features on the digital image of the check. Generating operation 860 generates estimated positional information of the one or more check features on the check. Determining operation 870 determines a set of rotation and scaling adjustments. Generating operation 880 generates a more accurate representation of the check by applying rotational and scaling adjustments. Displaying operation 890 displays accountholder and/or check parameter information.

Figure 9:
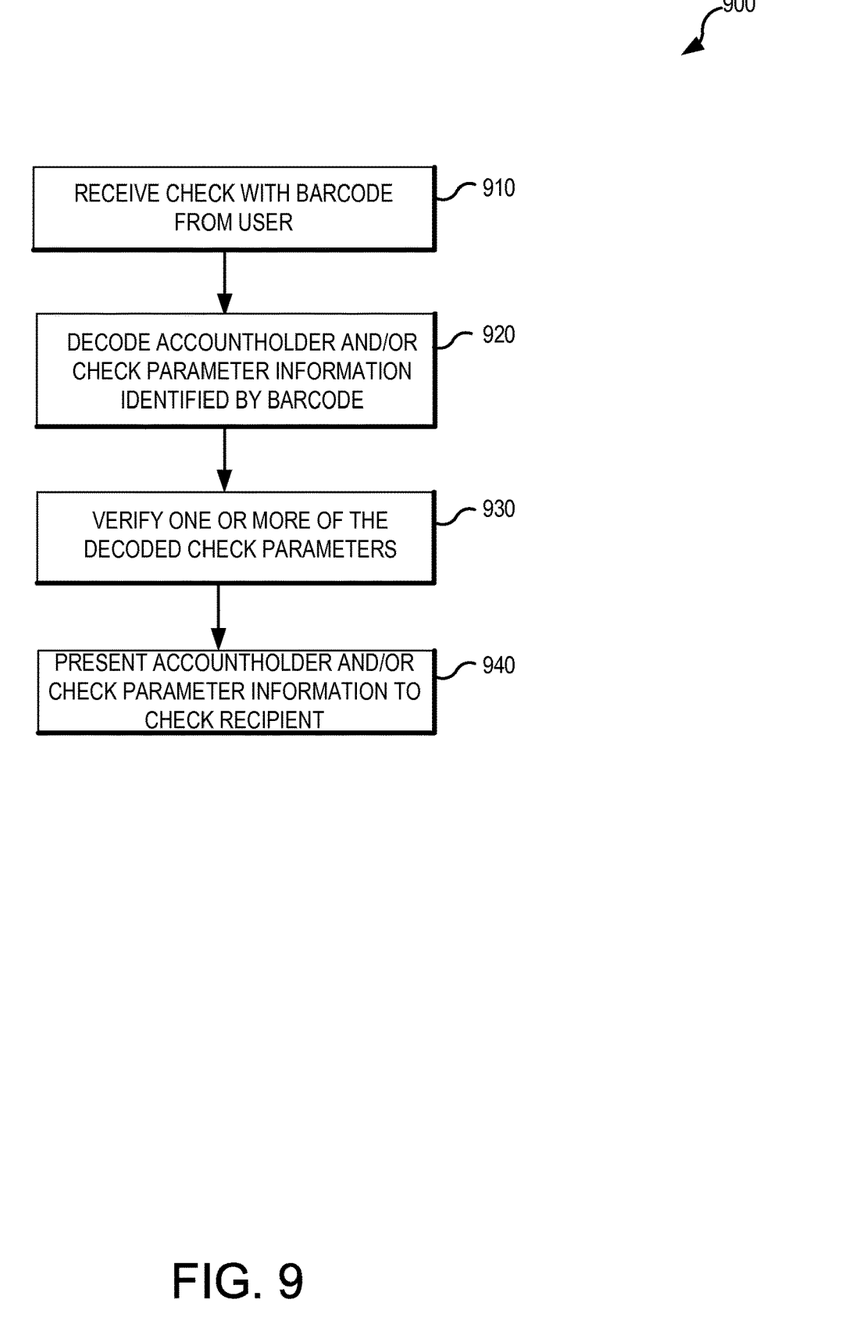
FIG. 9 is a flow chart illustrating a set of operations in accordance with one or more embodiments of the present disclosure.

FIG. 9 is a flow chart illustrating a set of operations 900. Receiving operation 910 receives a check with a barcode from a user at a point of sale. Decoding operation 920 decodes accountholder and/or check parameter information identified by the barcode. Verifying operation 930 verifies one or more of the decoded check parameters. Presenting operation 940 presents accountholder and/or check parameter information to the check recipient.

Figure 10:
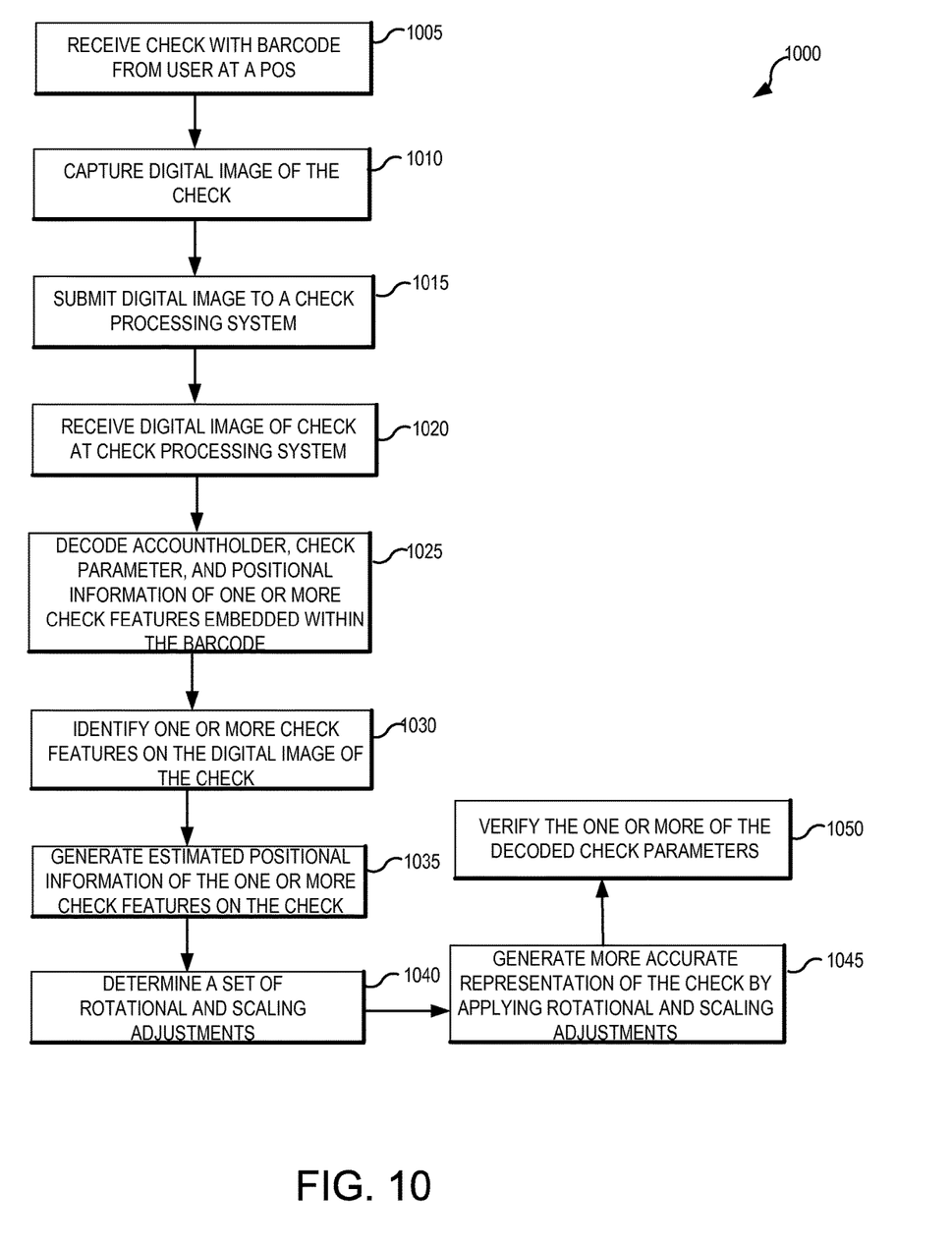
FIG. 10 is a flow chart illustrating a set of operations in accordance with one or more embodiments of the present disclosure.

FIG. 10 is a flow chart illustrating a set of operations 1000. Receiving operation 1005 receives a check with a barcode from a user at a point of sale. Capturing operation 1010 captures a digital image of the check. Submitting operation 1015 submits a digital image to a check processing system. Receiving operation 1020 receives a digital image of the check at a check processing system. Decoding operation 1025 decodes accountholder, check parameter, and positional information of one or more of the check features embedded within the barcode. Identifying operation 1030 identifies one or more check features on the digital image of the check. Generating operation 1035 generates estimated positional information of the one or more check features on the check. Determining operation 1040 determines a set of rotation and scaling adjustments. Generating operation 1045 generates a more accurate representation of the check by applying rotational and scaling adjustments. Verifying operation 1050 verifies one or more of the decoded check parameters.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to processing a single image of a check, embodiments of the present invention are equally applicable to various other documents. In addition, embodiments of the present invention are also applicable to processing multiple images or video captures of a check or document to produce a more accurate image for processing. For example, a user may take multiple images of a check. This could be at the request of the system or supplied without prompting by the user. The system can then process the images and create a composite image (e.g., using the 2D barcodes and signal processing techniques) which can be used to decrease the non-conforming image percentage.

Also, for the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present invention provides novel systems, methods and arrangements for systems and methods to electronically process digital images of checks. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A fraud prevention method comprising:
receiving, at a point of sale device, a check from a user, wherein the check includes a two-dimensional barcode identifying account holder information and one or more check parameters;
capturing a digital image of the check;
submitting, via a communications network, the digital image of the check to a check processing system;
decoding, by a computing device associated with the check processing system, the one or more check parameters identified by the two-dimensional barcode, wherein the one or more check parameters includes an amount allowed on the check;
transferring the account holder information and the amount allowed on the check to the point of sale device;
decoding, by the computing device, information regarding one or more check features embedded within the two-dimensional barcode, wherein the information includes positional information of the one or more check features;
optically identifying, by the computing device, the one or more check features on the digital image of the check;
generating, by the computing device, estimated positional information for the one or more check features that were optically identified;
determining, by the computing device, a set of rotational and scaling adjustments by comparing the estimated positional information with the positional information of the one or more check features; and
applying, by the computing device, the set of rotational and scaling adjustments to the digital image of the check to produce a more accurate representation of the check.

2. The fraud prevention method of claim 1, wherein the account holder information includes a driver's license number, a signature, or a photo of an account holder.

3. The fraud prevention method of claim 1, further comprising:
processing the digital image of the check using the one or more check parameters.

4. The fraud prevention method of claim 3, wherein the one or more check parameters include an account indicator, account information, a government identifier, or an electronic watermark.

5. The fraud prevention method of claim 1, further comprising electronically processing the more accurate representation of the check using a routing transit number associated with the check.

6. The fraud prevention method of claim 1, wherein the one or more check features include a signature line, a date line, a memo line, a check number, a magnetic ink character recognition (MICR) code, an amount line, or an amount block.

7. The fraud prevention method of claim 1, wherein the positional information embedded within the two-dimensional barcode includes a size of the check, a distance to a signature line on the check, a distance to one or more edges of the check, a distance from an edge of the check to the top, bottom, start, or end of a magnetic ink character recognition (MICR) code, and a distance to amount block on the check.

8. A fraud prevention method comprising:
receiving, from a point of sale device, a check from a user that includes a barcode identifying one or more check parameters;
capturing, at the point of sale device, a digital image of the check;
submitting, via a network, the digital image of the check to a check processing system;
decoding, by a processor, the one or more check parameters identified by the barcode, wherein the one or more check parameters includes an amount allowed on the check; and
verifying, during processing of the check by the check processing system, the one or more check parameters that were decoded.

9. The fraud prevention method of claim 8, wherein the one or more check parameters further includes an account indicator if the check is drawn from a business account or a personal account, account information, a government identifier, or an electronic watermark.

10. The fraud prevention method of claim 8, wherein account holder information is identified in the barcode and the method further comprises:
decoding the account holder information identified within the barcode; and
presenting the account holder information to a recipient of the check.

11. The fraud prevention method of claim 8, wherein the barcode is a two-dimensional barcode.

12. The fraud prevention method of claim 8, wherein the check from the user is a digital image of the check.

13. The fraud prevention method of claim 8, further comprising:
receiving, at the check processing system, the digital image of the check that has been remotely captured;
decoding any positional information of one or more check features embedded within the barcode;
identifying the one or more check features on the digital image of the check;
generating estimated positional information for the one or more check features that were identified;
determining a set of rotational and scaling adjustments by comparing the estimated positional information with the positional information of the one or more check features; and applying the set of rotational and scaling adjustments to the digital image of the check to produce a more accurate representation of the check.

14. A non-transitory computer-readable storage medium containing a set of instructions, which, when executed by one or more processors, causes a machine to:
receive, by a point of sale device, a check from a user, wherein the check includes a barcode identifying account holder information and one or more check parameters;
capture a digital image of the check;
submit, via a communications network, the digital image of the check to a check processing system,
wherein the check processing system decodes the one or more check parameters identified by the barcode, wherein the one or more check parameters includes an amount allowed on the check; and
transfer the account holder information and the amount allowed on the check to a display device.

15. The non-transitory computer-readable storage medium of claim 14, wherein the set of instructions, when executed by the one or more processors, further causes the machine to electronically process the check using a routing transit number found on the check.

16. The non-transitory computer-readable storage medium of claim 14, wherein the set of instructions, when executed by the one or more processors, further causes the machine to:
verify the one or more check parameters that were decoded during the processing of the check.

17. The non-transitory computer-readable storage medium of claim 14, wherein the check processing system further:
decodes information regarding one or more check features embedded within the barcode, wherein the information includes positional information of the one or more check parameters;
optically identifies the one or more check parameters on the digital image of the check;
generates estimated positional information for the one or more check parameters that were optically identified;
determines a set of rotational and scaling adjustments by comparing the estimated positional information with the positional information of the one or more check parameters; and
applies the set of rotational and scaling adjustments to the digital image of the check to produce a more accurate representation of the check.

* * * * *